(12) United States Patent
Chen (10) Patent No.: US 10,245,500 B2
(45) Date of Patent: Apr. 2, 2019

(54) FLYING SKATEBOARD

(71) Applicant: Jiangsu Digital Eagle Technology Development Co., Ltd., Wuxi (CN)

(72) Inventor: Lechun Chen, Wuxi (CN)

(73) Assignee: JIANGSU DIGITAL EAGLE TECHNOLOGY DEVELOPMENT CO., LTD., Wuxi (CN)

( * ) Notice: Subject to any disclaimer, the term of this patent is extended or adjusted under 35 U.S.C. 154(b) by 207 days.

(21) Appl. No.: 15/322,119

(22) PCT Filed: Mar. 25, 2016

(86) PCT No.: PCT/CN2016/077295
§ 371 (c)(1),
(2) Date: Dec. 26, 2016

(87) PCT Pub. No.: WO2017/107329
PCT Pub. Date: Jun. 29, 2017

(65) Prior Publication Data
US 2018/0140933 A1  May 24, 2018

(30) Foreign Application Priority Data

Dec. 22, 2015 (CN) .......................... 2015 1 0971447

(51) Int. Cl.
*A63C 17/01* (2006.01)
*B64C 39/02* (2006.01)
(Continued)

(52) U.S. Cl.
CPC .............. *A63C 17/01* (2013.01); *A63C 17/00* (2013.01); *A63C 17/013* (2013.01); *A63C 17/12* (2013.01);
(Continued)

(58) Field of Classification Search
CPC ....... B64C 39/026; B64C 39/02; B64C 27/20; A63C 17/01
See application file for complete search history.

(56) References Cited

U.S. PATENT DOCUMENTS 2,417,896 A     3/1947 Zimmerman
2,847,173 A *   8/1958 McCarty, Jr. ......... B64C 39/026
                                                244/17.11
(Continued)

FOREIGN PATENT DOCUMENTS

CN           2253230 Y      4/1997
CN         204623828 U      9/2015
(Continued)

*Primary Examiner* — Christopher P Ellis
(74) *Attorney, Agent, or Firm* — Gokalp Bayramoglu (57) ABSTRACT

Disclosed is a flying skateboard which comprises a bearing part, power parts, a main control module and altitude induction modules. The bearing part comprises a left foot bearing area and a right foot bearing area which are connected, can rotate oppositely when pedaled with foot soles of a human body and can be located on the same plane or on different planes. The main control module comprises a gyroscope and used for controlling the power output of the power parts to keep the balance of the flying skateboard and make the flying skateboard to vertically move up and down or hover. The altitude induction modules are used for measuring the distances between the altitude induction modules and the ground to make the flying altitude of the flying skateboard within the altitude limit threshold value range.

10 Claims, 8 Drawing Sheets

(51) Int. Cl.
*A63C 17/00* (2006.01)
*B64C 27/20* (2006.01)
*B64C 13/04* (2006.01)
*B64C 13/16* (2006.01)
*A63C 17/12* (2006.01)
*A63C 17/26* (2006.01)

(52) U.S. Cl.
CPC .......... *A63C 17/267* (2013.01); *B64C 13/044* (2018.01); *B64C 13/16* (2013.01); *B64C 27/20* (2013.01); *B64C 39/026* (2013.01); *A63C 2203/12* (2013.01); *B64C 39/02* (2013.01)

(56) References Cited

U.S. PATENT DOCUMENTS

| | | | | |
|---|---|---|---|---|
| 2,953,321 A | * | 9/1960 | Robertson | B64C 39/026 180/117 |
| RE26,756 E | * | 1/1970 | Moore et al. | B64C 39/026 244/4 R |
| 5,071,089 A | * | 12/1991 | Fagan | A63C 11/00 244/16 |
| 6,905,096 B1 | * | 6/2005 | Tabor | A63C 17/26 244/153 R |
| 8,448,892 B2 | * | 5/2013 | Zhu | B64C 3/141 244/12.1 |
| 9,145,206 B1 | * | 9/2015 | Robinson | B63B 9/00 |
| 2007/0290097 A1 | * | 12/2007 | Ishiba | B64C 27/20 244/12.1 |
| 2015/0028161 A1 | * | 1/2015 | Parks | B63H 11/04 244/23 R |
| 2015/0064004 A1 | * | 3/2015 | Contoret | A63C 5/11 416/1 |
| 2015/0266573 A1 | * | 9/2015 | Wypyszynski | B64D 3/00 244/1 TD |
| 2016/0340035 A1 | * | 11/2016 | Duru | B64C 27/20 |
| 2017/0166309 A1 | * | 6/2017 | Sekiya | B64D 11/062 |

FOREIGN PATENT DOCUMENTS

| | | |
|---|---|---|
| CN | 105059072 A | 11/2015 |
| CN | 105151296 A | 12/2015 |
| CN | 205235352 U | 5/2016 |
| WO | WO2005072233 A2 | 8/2005 |
| WO | WO2015103700 A1 | 7/2015 |

* cited by examiner

FLYING SKATEBOARD

CROSS REFERENCE TO RELATED APPLICATIONS

This application is the national phase entry of International Application No. PCT/CN2016/077295, filed on Mar. 25, 2016, which is based upon and claims priority to Chinese Patent Application No. 201510971447.8 filed on Dec. 22, 2015, the entire contents of which are incorporated herein by reference.

BACKGROUND OF THE INVENTION

Technical Field

The present invention relates to the field of aircrafts, in particular to a flying skateboard which can be applied to the fields of entertainment, traffic, military etc.

Background

According to reports from foreign media, the magnetic levitation skateboard called the Hendo Hoverboard is designed by the Hendo Hover team in California of America. Four optical disc-shaped suspension engines are arranged at the bottom of the Hendo Hoverboard and can generate a special magnetic field. The optical disc-shaped engines can generate powerful thrust to lift up the Hendo Hoverboard from a ground made of metal plates according to the principle of a magnetic levitation train.

It is theoretically feasible to manufacture a manned skateboard according to the magnetic levitation principle, and one of the technical problems of the magnetic levitation skateboard is energy supply, specifically, a huge amount of energy is needed for taking a human body away from the ground by several feet and achieving stable movement, and the actually-required energy and power density far exceed the level which can be provided by current common lithium ion batteries. It is indeed the case that the Hendo Hoverboard is approximately one inch away from the ground after being suspended and can bear the weight of 300 pounds. However, the magnetic levitation skateboard costs about ten thousand dollars, and the battery life is only seven minutes.

In addition, a product based on the magnetic levitation technique is supplied with driving force by a superconducting magnet at the normal temperature. The problem lies in that during actual operation of the magnetic levitation train, a superconducting rail is needed for operation besides the train. However, only non-magnetic concrete ground can be provided for the magnetic levitation skateboard. Therefore, the Hendo Hoverboard has the main disadvantage that the Hendo Hoverboard can suspend only on non-ferrous metal surfaces and cannot be played in parks near houses freely. Engadget reports that the Hendo Hoverboard also has certain defects on the aspect of direction control.

SUMMARY OF THE INVENTION

The present invention aims to provide a flying skateboard which can truly become a novel entertainment product of young people and be popular globally and can even be applied to the fields of traffic, transportation and military through a reasonable power structure and a free and accurate control mode.

The technical scheme of the present invention is as follows:

A flying skateboard comprises:

A bearing part, wherein the bearing part comprises a left foot bearing area and a right foot bearing area which are used for bearing the left foot and the right foot of a human body, the left foot bearing area and the right foot bearing area are connected and can rotate oppositely when pedaled with foot soles of the human body so that the left foot bearing area and the right foot bearing area can be located on the same plane or located on different planes, and the bearing part works in cooperation with power parts to make the flying skateboard to advance, retreat, brake, horizontally move leftwards and rightwards, and turn left and right;

power parts, wherein the power parts are arranged on the periphery of the bearing part and used for supplying power to the flying skateboard for movement in all directions;

a main control module, wherein the main control module comprises a gyroscope and is installed on the bearing part and used for controlling the power output of the power parts to keep the balance of the flying skateboard and make the flying skateboard to vertically move up and down or hover;

altitude induction modules, wherein the altitude induction modules are installed on the bearing part, altitude limit threshold values are set in the altitude induction modules, and the altitude induction modules are used for measuring the distances between the altitude induction modules and the ground and work in cooperation with the power parts to keep the flight altitude of the flying skateboard within the altitude limit threshold value range.

Furthermore, the left foot bearing area and the right foot bearing area are connected and can rotate oppositely when pedaled with the foot soles of the human body so that the left foot bearing area and the right foot bearing area can be located on the same plane or located on different planes.

Furthermore, when the bearing part integrally inclines forwards, the power parts also incline forwards, and the flying skateboard advances; when the bearing part internally inclines backwards, the power parts also incline backwards, and the flying skateboard retreats or brakes; when the bearing part integrally inclines leftwards, the power parts also incline leftwards, and the flying skateboard horizontally moves leftwards; when the bearing parts integrally inclines rightwards, the power parts also incline rightwards, and the flying skateboard horizontally moves rightwards.

Furthermore, when the left foot bearing area rotates backwards relative to the right foot bearing area, the power part connected with the left foot bearing area also inclines backwards relative to the power part connected with the right foot bearing area, and the flying skateboard turns left; when the left foot bearing area rotates forwards relative to the right foot bearing area, the power part connected with the left foot bearing area also inclines forwards relative to the power part connected with the right foot bearing area, and the flying skateboard turns right; when the left foot bearing area and the right foot bearing area are located on the same plane, the power part connected with the left foot bearing area and the power part connected with the right foot bearing area are also located on the same plane, and the flying skateboard does not turn.

Furthermore, the power parts each comprise a plurality of power segments, and the plurality of power segments are all connected with the bearing part and arranged on the left foot bearing area and the right foot bearing area of the bearing part uniformly.

Furthermore, each power segment comprises one or more power module arranged in an array mode and is covered with a cover plate, the cover plates are provided with air holes above the power modules correspondingly, and airflow hoods are installed in the air holes of the cover plates correspondingly.

Furthermore, the power modules are internal combustion engines or motors or duct engines or jet engines or rocket engines.

Furthermore, sensors are installed on the surface of the left foot bearing area and the surface of the right foot bearing area correspondingly and used for sensing motions of the left foot and the right foot of the human body and the pressure applied to the flying skateboard.

The present invention has the beneficial technical effects that:

Both hands of the rider can be completely liberated through the control mode of the present invention, the operating way of a skateboard is simulated truly, and people can enjoy the unique experience of gliding and simulated surfing. The present invention fills a market niche, and people can enjoy the fun of gliding in the air during exercising and feel the charm and grace of surfing, so that the mind and body of people are delighted, and the willpower of the rider is tempered. The present invention can even be applied to the actual fields of traffic, transportation, military and the like after the technique is perfected.

DETAILED DESCRIPTION OF THE INVENTION

A further description of the specific execution mode of the present invention is given with accompanying drawings as follows.

Figure 1:
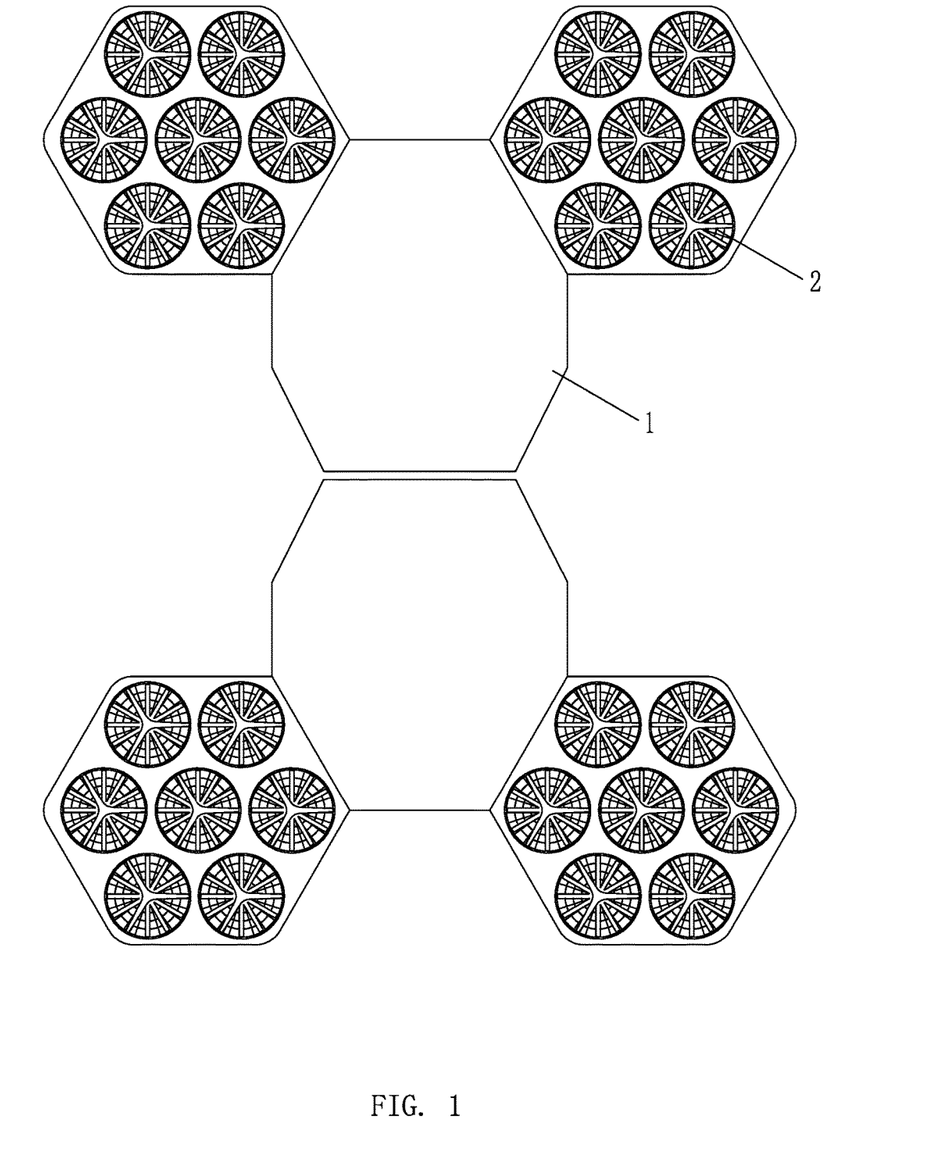
FIG. 1 is a top view of the present invention.
Figure 2:
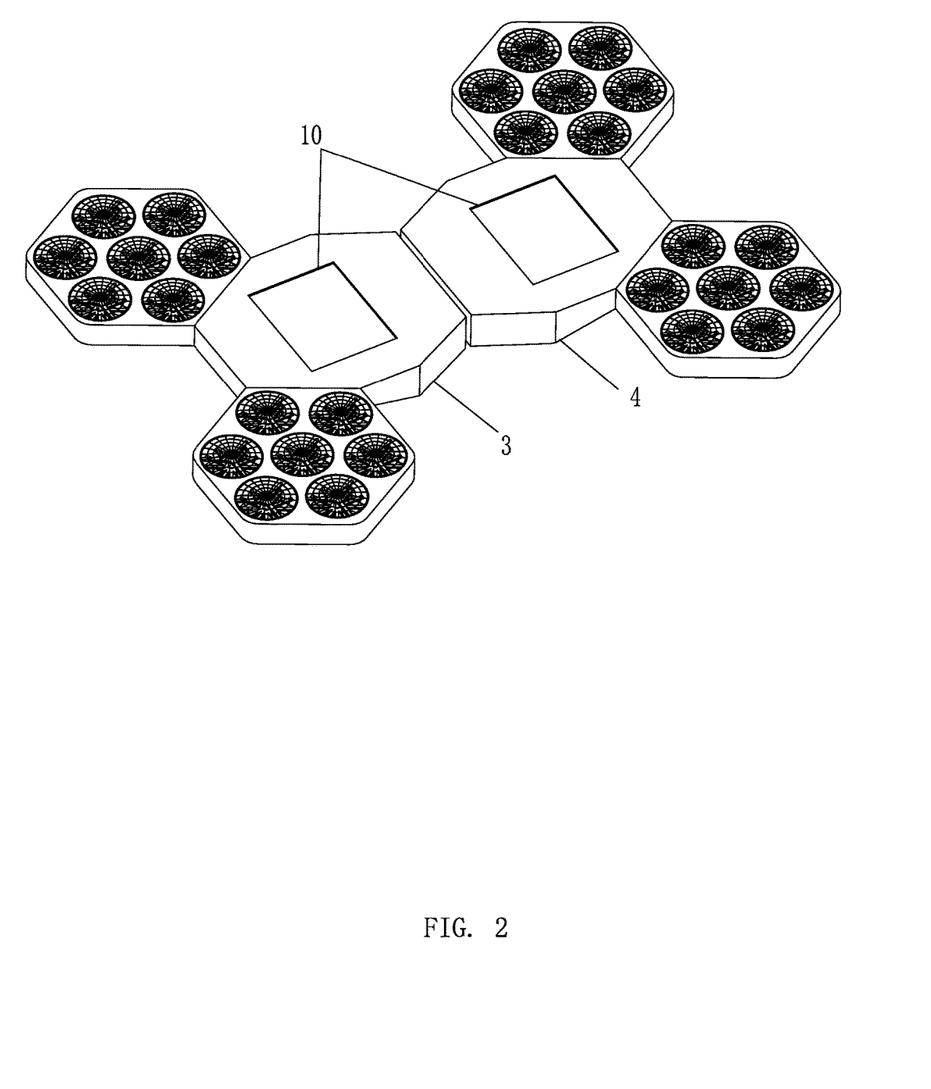
FIG. 2 is a stereo view of the present invention.

FIG. 1 and FIG. 2 are views of the present invention. As is shown in FIG. 1 and FIG. 2, the flying skateboard of the present invention comprises a bearing part 1 and power parts 2.

Figure 3:
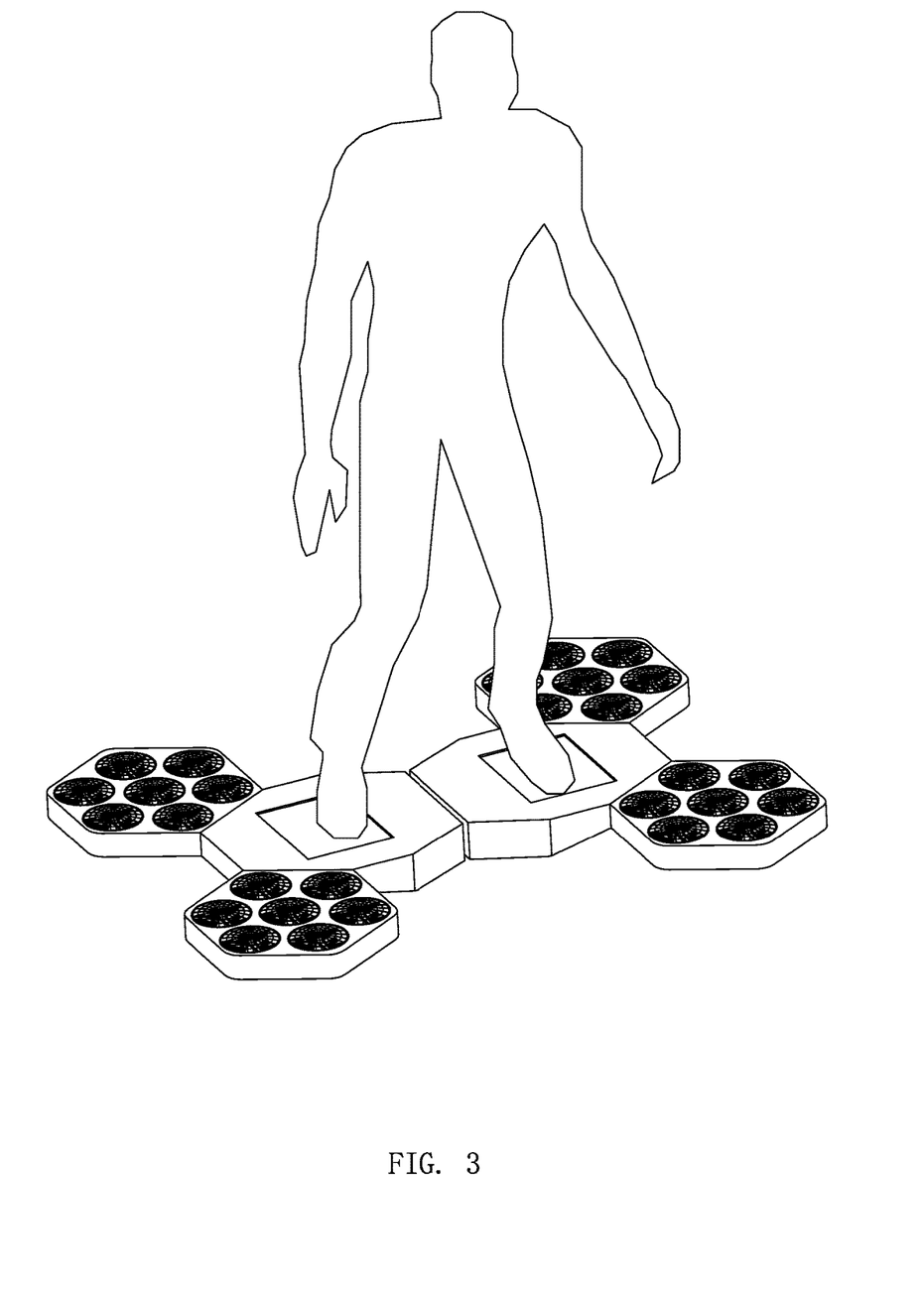
FIG. 3 is a manned-state view of the present invention.

The bearing part 1 comprises two bearing areas (as is shown in FIG. 2), namely the left foot bearing area 3 and the right foot bearing area 4. When a human body stands on the bearing part 1 (as is shown in FIG. 3), the left foot bearing area 3 is used for bearing the left foot of the human body, and the right foot bearing area 4 is used for bearing the right foot of the human body. The left foot bearing area 3 and the right foot bearing area 4 are connected and can rotate oppositely when pedaled with the food soles of the human body so that the left foot bearing area 3 and the right foot bearing area 4 can be located on the same plane or located on different planes. The power parts 2 are arranged on the periphery of the bearing part 1 and used for supplying power to the flying skateboard for movement in all directions.

The power parts 2 each comprise a plurality of power segments, and the plurality of power segments are all connected with the bearing part 1 and arranged on the left foot bearing area 3 and the right foot bearing area 4 of the bearing part 1 uniformly. As is shown in FIG. 1 and FIG. 2, four power segments are included, two of the four power segments are arranged on the left front portion and the left rear portion of the left foot bearing area 3, and the other two power segments are arranged on the right front portion and right rear portion of the right foot bearing area 4.

Figure 4:
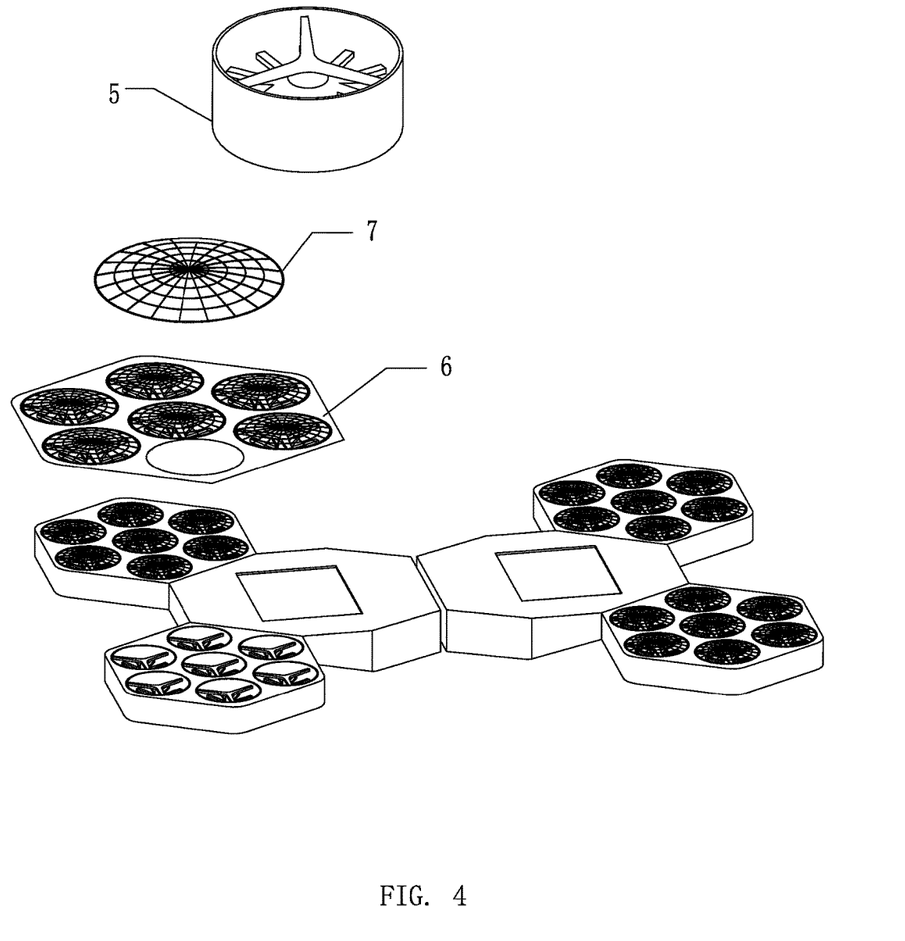
FIG. 4 is an exploded view of power parts of the present invention.

FIG. 4 is the exploded view of the power parts of the present invention. As is shown in FIG. 4, each power segment comprises one or more power module 5 arranged in an array mode, and the power modules 5 are internal combustion engines or motors or duct engines or jet engines or rocket engines. Each power segment is covered with a cover plate 6, the cover plates 6 are provided with air holes above the power modules 5 correspondingly, and airflow hoods 7 are installed in the air holes of the cover plates correspondingly.

The control mode of the movement direction of the flying skateboard of the present invention is as follows:

1. Advancing, retreating, braking and horizontal movement are controlled in a mechanical control mode simulating a ground skateboard through foot motions of an operator:

When the bearing part 1 inclines forwards, the power parts 2 also incline forwards to generate forward acting force, and the flying skateboard advances:

when the bearing part 1 inclines backwards, the power parts 2 also incline backwards to generate backward acting force, and the flying skateboard retreats or brakes:

when the bearing part 1 inclines leftwards, the power parts 2 also incline leftwards to generate leftward acting force, and the flying skateboard horizontally moves leftwards;

when the bearing part 1 inclines rightwards, the power parts 2 also incline rightwards to generate rightward acting force, and the flying skateboard horizontally moves rightwards.

Figure 5:
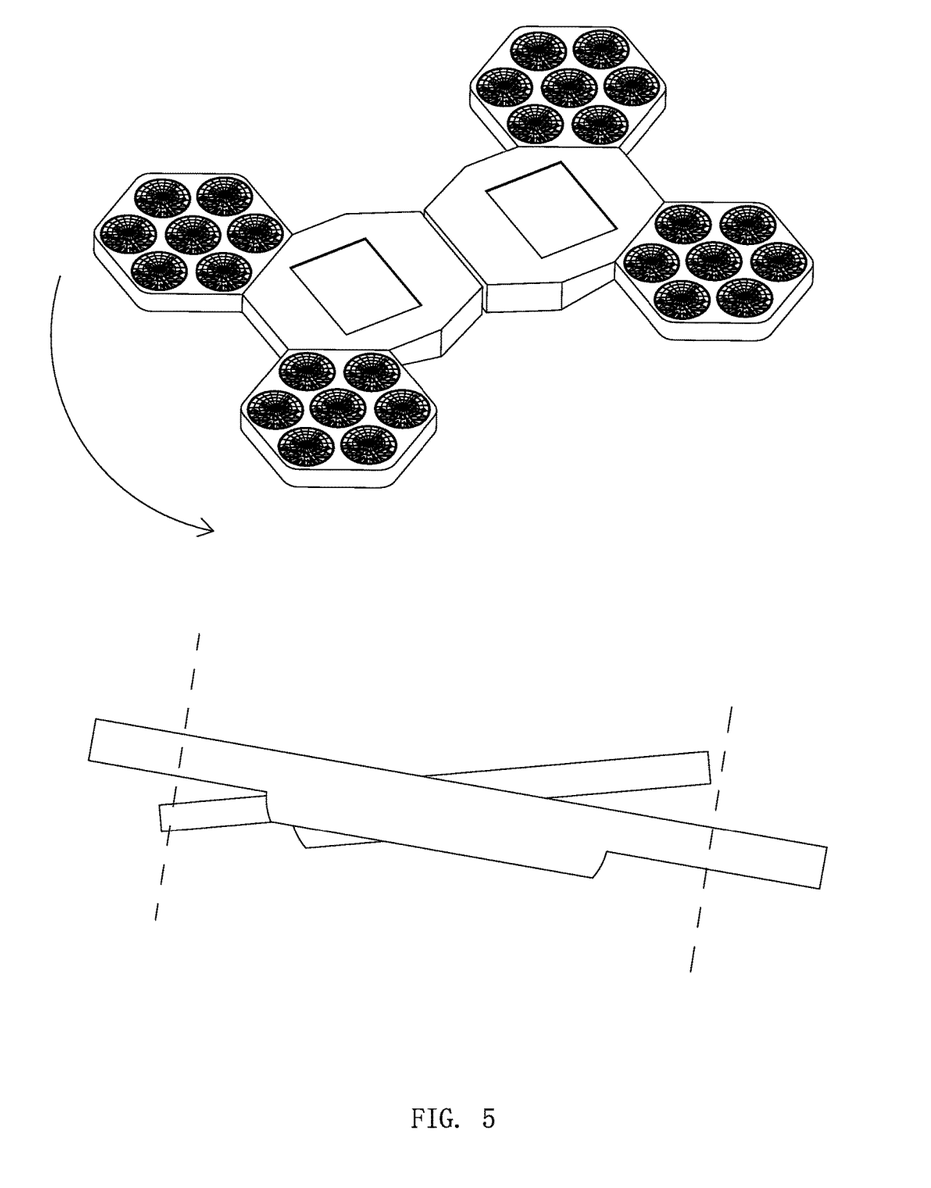
FIG. 5 is a turning-left state view of the present invention.
Figure 6:
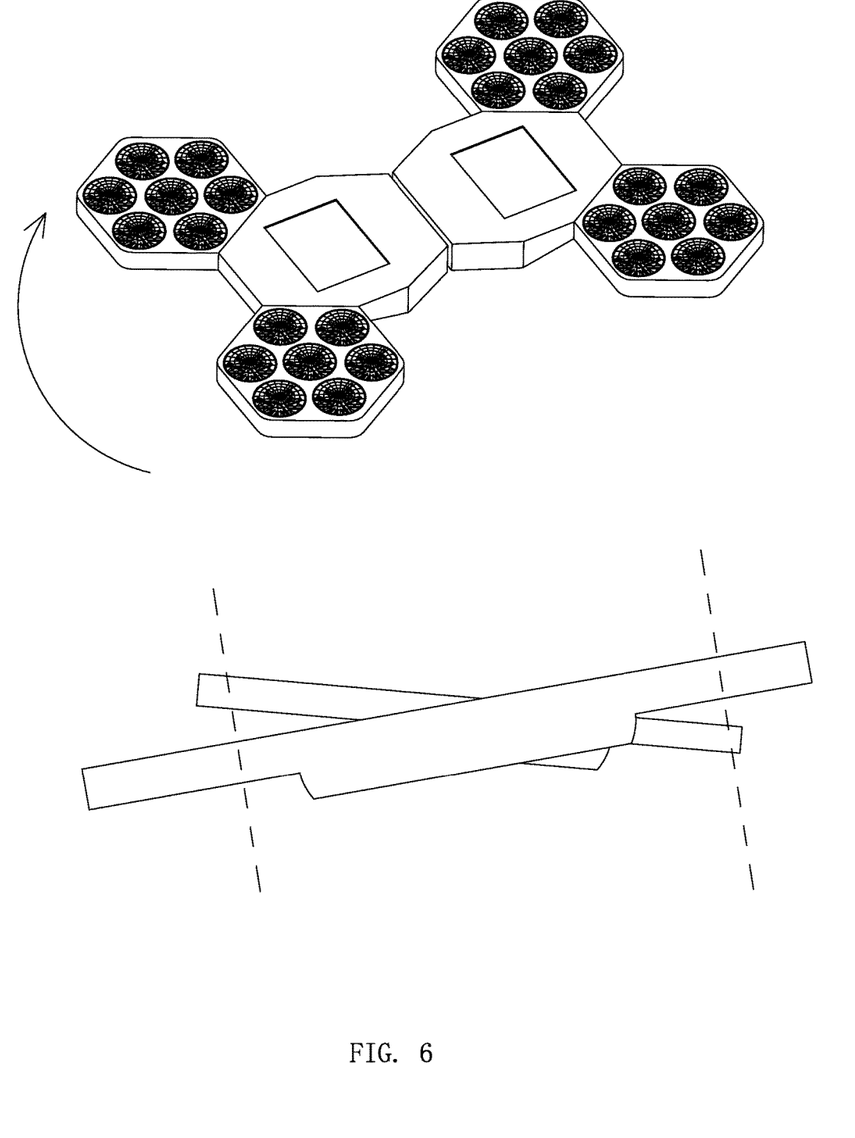
FIG. 6 is a turning-right state view of the present invention.

2. Turning is controlled in a mechanical control mode through foot motions of the operator:

As is shown in FIG. 5, when the left foot bearing area 3 rotates backwards relative to the right foot bearing area 4, the power part connected with the left foot bearing area 3 also inclines backwards relative to the power part connected with the right foot bearing area 4, so that turning-left acting force is generated, and the flying skateboard turns left:

as is shown in FIG. 6, when the left foot bearing area 3 rotates forwards relative to the right foot bearing area 4, the power part connected with the left foot bearing area 3 also inclines forwards relative to the power part connected with the right foot bearing area 4, so that turning-right acting force is generated, and the flying skateboard turns right;

when the left foot bearing area 3 and the right foot bearing area 4 are located on the same plane, the power part connected with the left foot bearing area 3 and the power part connected with the right foot bearing area 4 are also located on the same plane, so that no turning acting force is generated, and the flying skateboard does not turn.

Figure 7:
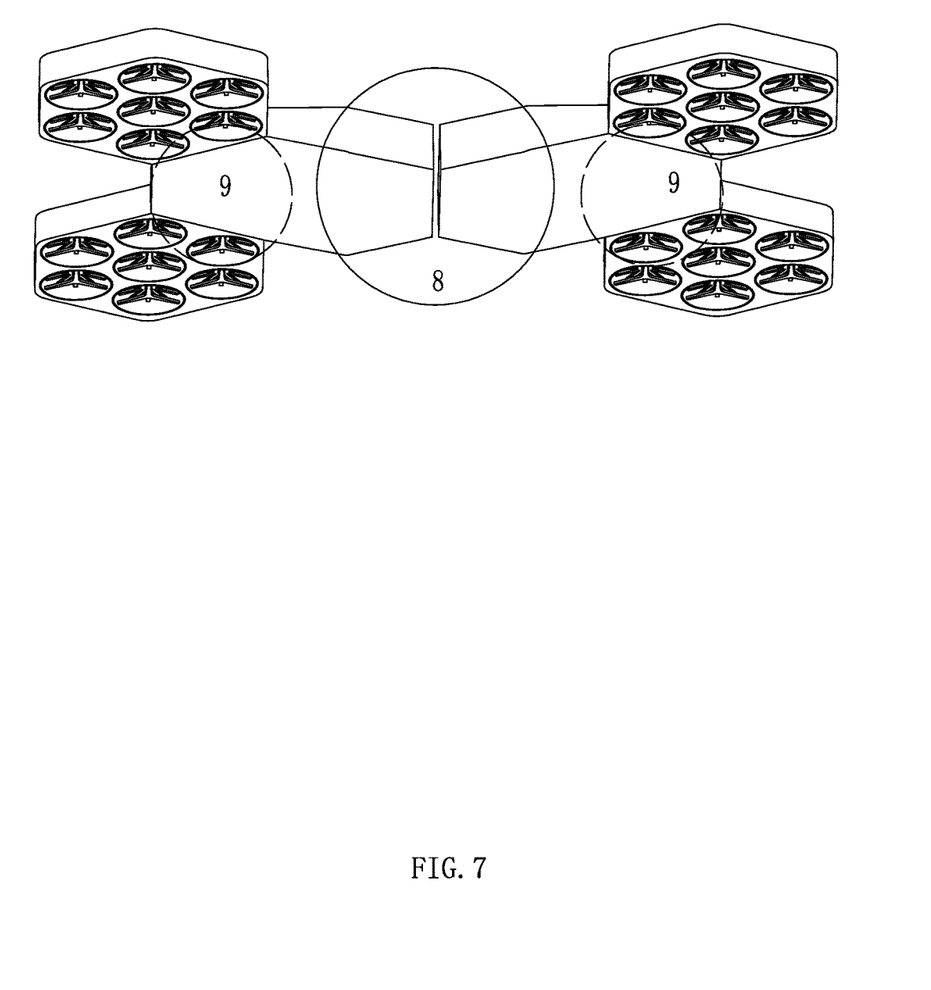
FIG. 7 is a module installation position view of the present invention.

3. Altitude control is achieved through an existing flying control mode and assisted with altitude limit control:

Please see FIG. 7, a main control module 8 is installed between the left foot bearing area 3 and the right foot bearing area 4 in the embodiment. The main control module 8 adopts existing flying control, comprises a gyroscope and can control the power output of all the plurality of power segments, so that the balance of the flying skateboard is kept, and the flying skateboard is made to vertically move up and down or hover in the air.

Figure 8:
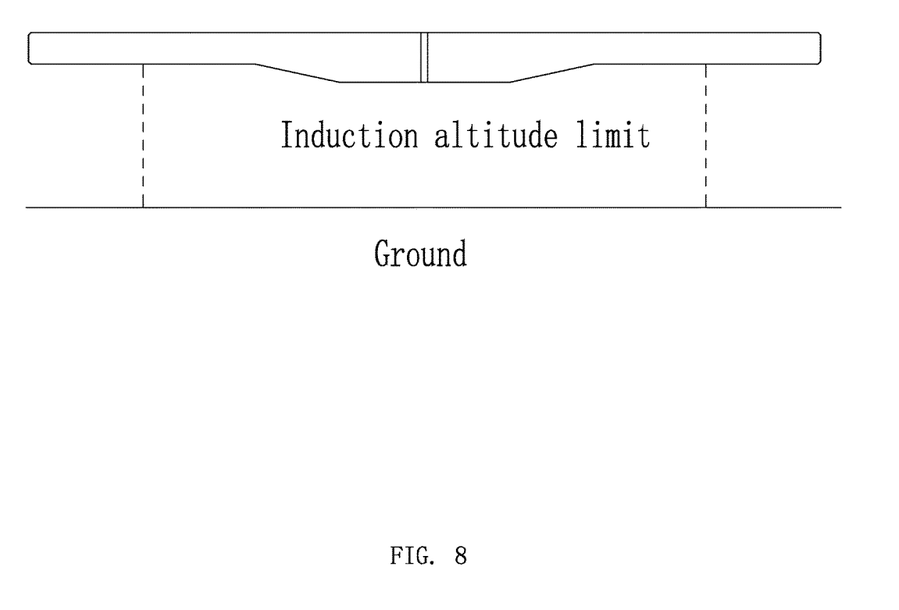
FIG. 8 is an altitude limit induction schematic diagram of the present invention.

Please see FIG. 7, altitude induction modules 9 are installed at the junctions of the bearing part 1 and the power parts 2. Altitude limit threshold values are set in the altitude induction modules 9. As is shown in FIG. 8, the altitude induction modules 9 can measure the distances between the altitude induction modules 9 and the ground and give an alarm to the operator of the flying skateboard when the distances exceed the altitude limit threshold values, so that it is ensured that the flying skateboard is at the safe altitude.

Selectively, sensors 10 (as is shown in FIG. 2) are installed on the surface of the left foot bearing area 3 and the surface of the right foot bearing area 4 correspondingly and used for sensing motions of the left foot and the right foot of the human body and the pressure applied to the surface of the bearing part 1 and sending the information to the main control module 8, and auxiliary control is achieved through the main control module 8.

The foregoing description is only the preferred embodiment of the present invention, and the present invention is not limited to the description. It can be understood that other improvements and changes which are directly derived or thought out by those skilled in the field without deviating the spirit and conception of the present invention are all included in the protection scope of the present invention.

What is claimed is:

1. A flying skateboard, comprising a bearing part, power parts, a main control module and altitude induction modules; wherein
   the bearing part comprises a left foot bearing area and a right foot bearing area configured for bearing a left foot and a right foot of a human body; the left foot bearing area and the right foot bearing area are connected with each other; and the left foot bearing area and the right foot bearing area are configured to rotate oppositely under a pressure generated by pedaling on the left foot bearing area and the right foot bearing area with foot soles of the human body, so that the left foot bearing area and the right foot bearing area are controlled to located on a same plane or different planes;
   the power parts are arranged on the periphery of the bearing part and configured for supplying power to the flying skateboard for movement in all directions;
   the main control module comprises a gyroscope; and the gyroscope is installed on the bearing part and is configured for controlling a power output of the power parts to keep balance of the flying skateboard and make the flying skateboard to move vertically up and down or hover;
   the altitude induction modules are installed on the bearing part, altitude limit threshold values are set in the altitude induction modules, and the altitude induction modules are configured for measuring the distances between the altitude induction modules and the ground; and the altitude induction modules work in cooperation with the power parts to keep the flight altitude of the flying skateboard within the altitude limit threshold value range.

2. The flying skateboard according to claim 1, wherein when the bearing part integrally inclines forwards, the power parts also incline forwards, and the flying skateboard moves forward; when the bearing part internally inclines backwards, the power parts also incline backwards, and the flying skateboard moves backward or brakes; when the bearing part integrally inclines leftwards, the power parts also incline leftwards, and the flying skateboard horizontally moves to the left; when the bearing part integrally inclines rightwards, the power parts also incline rightwards, and the flying skateboard horizontally moves to the right.

3. The flying skateboard according to claim 1, wherein when the left foot bearing area rotates backwards relative to the right foot bearing area, the power parts connected with the left foot bearing area also inclines backwards relative to the power parts connected with the right foot bearing area, and the flying skateboard turns left; when the left foot bearing area rotates forwards relative to the right foot bearing area, the power parts connected with the left foot bearing area also incline forwards relative to the power parts connected with the right foot bearing area, and the flying skateboard turns right; when the left foot bearing area and the right foot bearing area are located on the same plane, the power parts connected with the left foot bearing area and the power parts connected with the right foot bearing area are also located on the same plane, and the flying skateboard does not turn in a direction.

4. The flying skateboard according to claim 1, wherein each power parts comprises a plurality of power segments, and the plurality of power segments are all connected with the bearing part and arranged on the left foot bearing area and the right foot bearing area of the bearing part uniformly.

5. The flying skateboard according to claim 4, wherein each power segment comprises one or more power modules arranged in an array mode and each power module is covered with a cover plate, the cover plate is provided with air holes above the power module correspondingly, and airflow hoods are installed in the air holes of the cover plate correspondingly.

6. The flying skateboard according to claim 5, wherein the power modules are internal combustion engines or motors, duct engines, jet engines or rocket engines.

7. The flying skateboard according to claim 1, wherein sensors are installed on a surface of the left foot bearing area and a surface of the right foot bearing area correspondingly and configured for sensing motions of the left foot and the right foot of the human body and the pressure applied to the flying skateboard.

8. The flying skateboard according to claim 2, wherein each power part comprises a plurality of power segments, and the plurality of power segments are all connected with the bearing part and arranged on the left foot bearing area and the right foot bearing area of the bearing part uniformly.

9. The flying skateboard according to claim 2, wherein each power part comprises a plurality of power segments, and the plurality of power segments are all connected with the bearing part and arranged on the left foot bearing area and the right foot bearing area of the bearing part uniformly.

10. The flying skateboard according to claim 3, wherein each power part comprises a plurality of power segments, and the plurality of power segments are all connected with the bearing part and arranged on the left foot bearing area and the right foot bearing area of the bearing part uniformly.

* * * * *

UNITED STATES PATENT AND TRADEMARK OFFICE
CERTIFICATE OF CORRECTION

PATENT NO.         : 10,245,500 B2                                     Page 1 of 1
APPLICATION NO.    : 15/322119
DATED              : April 2, 2019
INVENTOR(S)        : Lechun Chen

It is certified that error appears in the above-identified patent and that said Letters Patent is hereby corrected as shown below:

On the Title Page

The (71) APPLICANT should be read:
--Jiangsu Digital Eagle Technology Co., Ltd., Wuxi (CN)--

The (73) ASSIGNEE should be read:
--Jiangsu Digital Eagle Technology Co., Ltd., Wuxi (CN)--

Signed and Sealed this
Fourteenth Day of May, 2019

Andrei Iancu
*Director of the United States Patent and Trademark Office*